(12) United States Patent
Kurashima

(10) Patent No.: US 6,807,021 B2
(45) Date of Patent: Oct. 19, 2004

(54) OPTICAL MODULE

(75) Inventor: Hiromi Kurashima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 36 days.

(21) Appl. No.: 10/342,348

(22) Filed: Jan. 15, 2003

(65) Prior Publication Data

US 2003/0152340 A1 Aug. 14, 2003

(30) Foreign Application Priority Data

Jan. 15, 2002 (JP) .................................... P2002-006251

(51) Int. Cl.[7] ................................................ G02B 7/02
(52) U.S. Cl. ...................... 359/815; 359/152; 359/154
(58) Field of Search ................................ 359/819, 808, 359/811, 152, 154, 161, 179, 815; 385/33, 35, 58, 60, 88, 89, 92, 93

(56) References Cited

U.S. PATENT DOCUMENTS

| | | | | |
|---|---|---|---|---|
| 4,690,492 A | * | 9/1987 | Beard | 385/89 |
| 5,787,215 A | * | 7/1998 | Kuhara et al. | 385/88 |
| 6,287,128 B1 | * | 9/2001 | Jones et al. | 439/76.1 |
| 6,302,596 B1 | * | 10/2001 | Cohen et al. | 385/93 |
| 6,304,436 B1 | | 10/2001 | Branch et al. | 361/683 |
| 6,335,869 B1 | | 1/2002 | Branch et al. | 361/816 |

OTHER PUBLICATIONS

"Proceedings of the 2001 IEICE General Confernce" Mar. 26–29, 2001 Ritsumeikan University, Kusatsu (with English Traslation).

* cited by examiner

Primary Examiner—Jordan M. Schwartz
Assistant Examiner—Jessica Stultz
(74) Attorney, Agent, or Firm—McDermott, Will & Emery

(57) ABSTRACT

An optical module of the present invention includes a housing containing a light receiving unit which is an optical subassembly, a notch is provided in a conductive bracket which covers lead pins of the light receiving unit, and a cylindrical stem portion of the light receiving unit having the maximum outer diameter juts out beyond a flat portion of the bracket and is thus exposed. Thus, the optical module has a configuration capable of containing the light receiving unit in the housing without interfering with the housing.

6 Claims, 5 Drawing Sheets

OPTICAL MODULE

BACKGROUND OF THE INVENTION

1. Field of the Invention

The present invention relates to an optical module which is applied for an optical transceiver or the like to attach to and detach from the optical link

2. Related Background Art

In a high speed LAN (local area network), an optical transceiver is widely used as a module which converts between a digital electrical signal and an optical signal. There is an optical transceiver of an SFF (small form factor) type as a unified standard capable of size reduction in order to increase the number of ports of a hub apparatus or the like using the above-mentioned optical transceiver and to provide the ports at high density. This SFF type optical transceiver is characterized by small size and low power consumption, and furthermore, an SFP (small form factor pluggable) type optical transceiver capable of attaching and detaching an electrical connector without stopping an apparatus has been developed

SUMMARY OF THE INVENTION

In such small-sized optical transceiver, components are arranged in close proximity. Thus, when there are fluctuations in dimensions of the components, the components, a package and an optical subassembly in particular, may contact with each other, and in addition, the unexpected stress acting on the optical subassembly may cause misalignment of an optical axis or an increase in thermal stress during the use of the optical transceiver.

It is an object of the present invention to provide an optical module having a configuration capable of improving shielding properties, while preventing the excessive stress acting on the optical components.

In order to solve the above-mentioned subject, an optical module according to the present invention is an optical module comprising an optical unit including a metallic package having a cylindrical stem, a light emitting or receiving device contained in the metal package, a cylindrical sleeve located in a light input/output terminal, and a lead pin extended on the side opposite to the sleeve and connected to the device, a board having an electronic circuit connected to the lead pin, an electrically conductive bracket which covers the lead pin, and a housing which contains the optical unit and the board covered with the bracket, wherein an optical axis of the device aligns in line with the center axes of the cylindrical stem and sleeve, and wherein the bracket is disposed so that a part of the stem is exposed and an outer wall surface of the bracket which exposes the part of the stem is located inside a circumferential wall surface of the stem and close to the center axis of the stem in a diameter direction.

In the above-described configuration, the stem portion of the optical unit which is an optical subassembly is exposed through the bracket which covers and electrically shields the lead pin, and the housing is located outside the stem portion. Thus, the bracket is not located between the stem portion and the housing, and thus, it is possible to prevent the excessive stress acting on the optical unit without strictly setting manufacturing tolerances of structural components. Therefore, this makes manufacturing easier, thereby improving manufacturing yields and also simplifying an assembly step. Moreover, the bracket is present around the lead pin, so that the bracket functions as an electrical shield and thus improves in electrical properties.

Preferably, the bracket has a flat surface on the outer wall surface at the portion which exposes the stem. This makes it possible to manufacture the bracket easily, and also ensures that the stem portion of the optical unit can be exposed.

Preferably, the housing includes a metallic cover which covers a portion extending from the board to the optical unit through the bracket. This can ensure shielding properties of the stem portion exposed through the bracket.

Preferably, such board has a signal input/output terminal and a power terminal for an external apparatus, which are located on the side opposite to the side to which the optical unit is disposed. This facilitates connecting to an external circuit.

Preferably, the optical module comprises a plurality of optical units. Preferably, the optical module comprises, for example, a light emitting unit having a light emitting device, and a light receiving unit having a light receiving device. This configuration is suitable for a SFF or SFP type optical transceiver.

DESCRIPTION OF THE PREFERRED EMBODIMENTS

Figure 1:
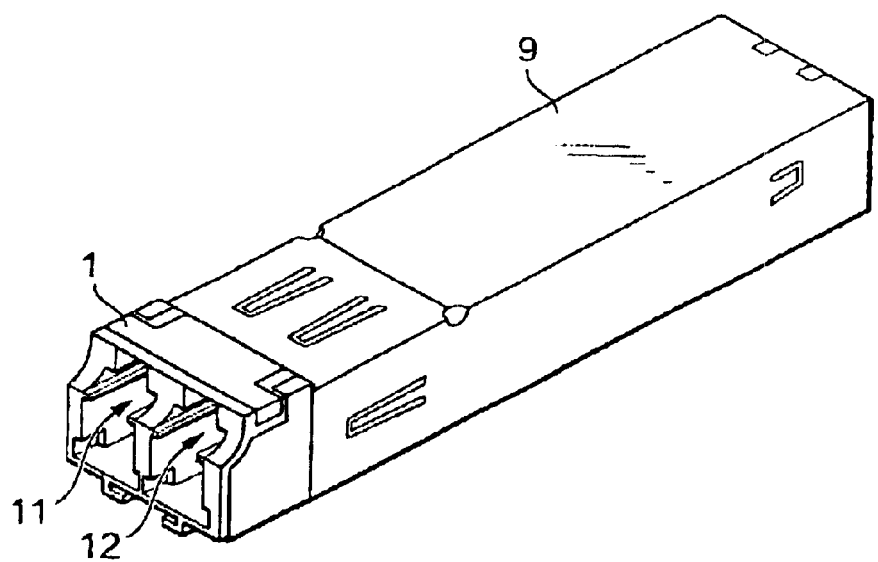
FIG. 1 is an external perspective view of an optical module (an optical transceiver) according to the present invention.

A preferred embodiment of the present invention will be described in detail below with reference to the accompanying drawings. To facilitate the comprehension of the explanation, the same reference numerals denote the same parts, where possible, throughout the drawings, and a repeated explanation will be omitted.

Figure 2:
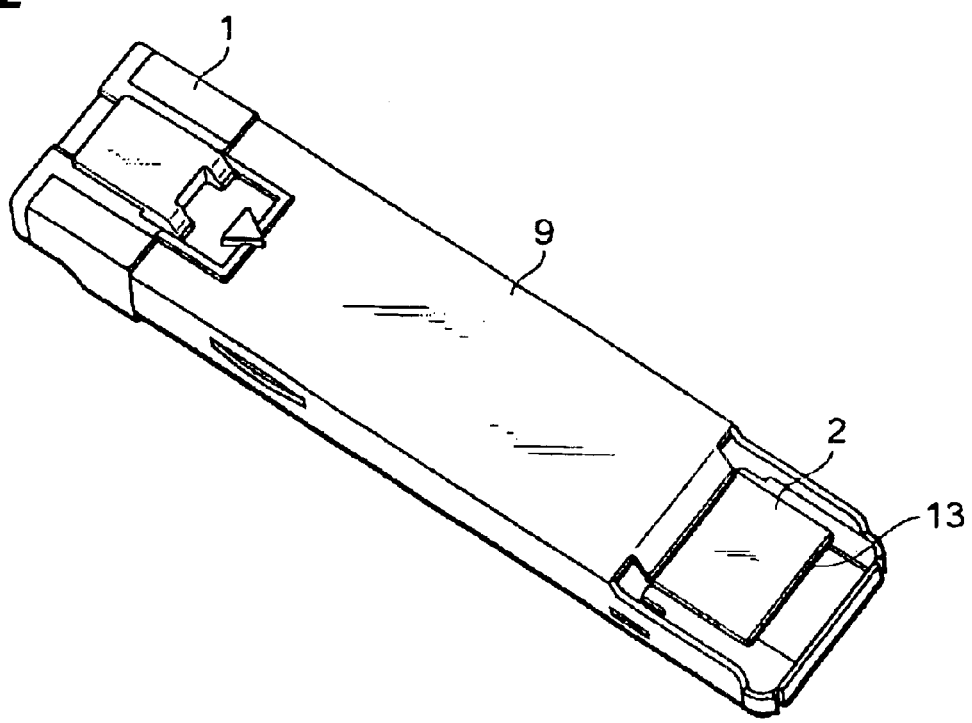
FIG. 2 is an external perspective view of the optical module of FIG. 1 viewed in a different direction.
Figure 3:
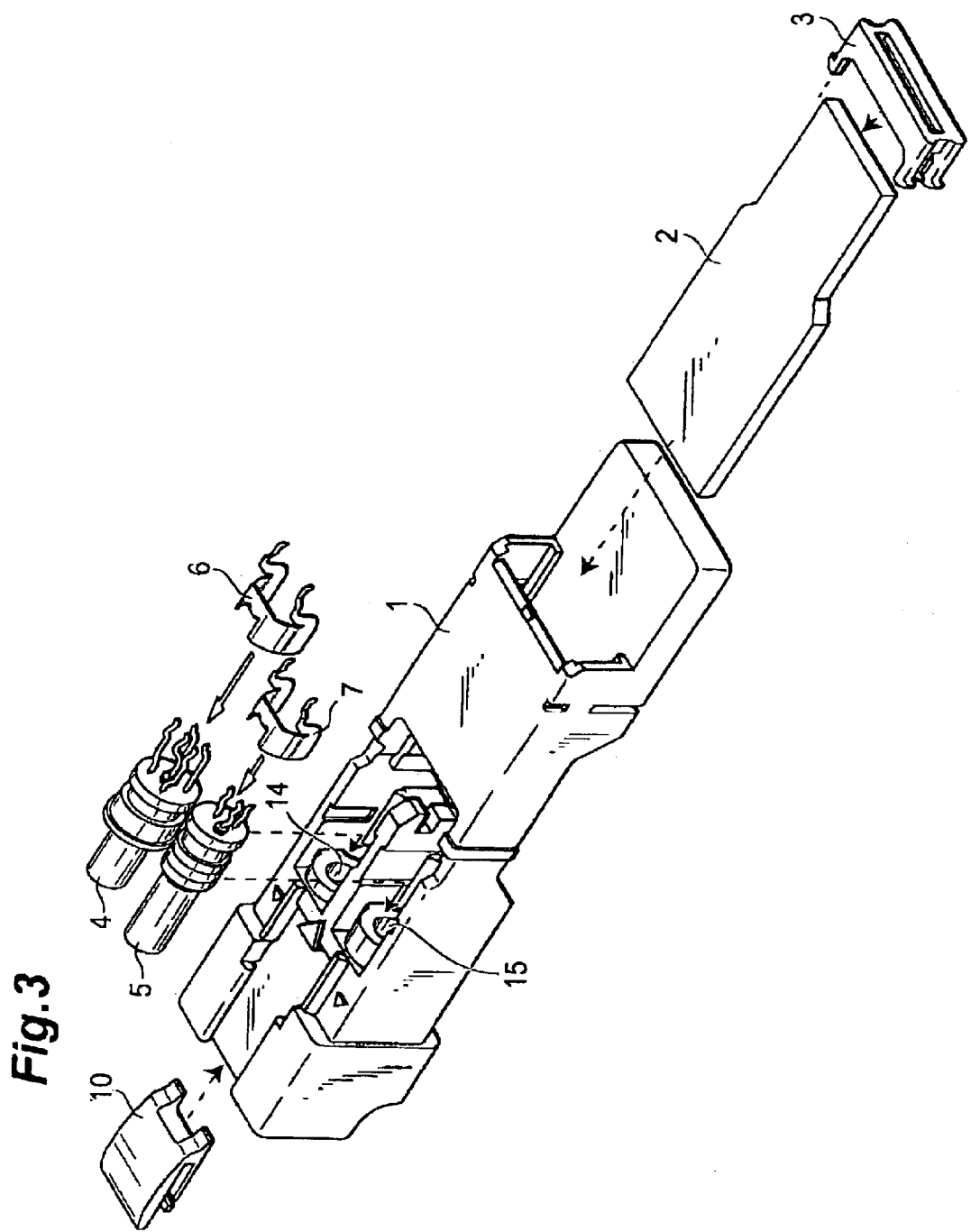
FIG. 3 is an exploded perspective view of the optical module shown in FIG. 1.

FIGS. 1 to 3 are schematic illustrations of a configuration of an optical transceiver which is an optical module according to the present invention. FIGS. 1 and 2 are perspective views of the optical transceiver viewed in different directions, and FIG. 3 is an exploded perspective view of the optical transceiver whose cover is removed so as to facilitate the understanding of its structural components.

The optical transceiver is an SFP type optical transceiver, which has a slender shape having a substantially rectangular cross section. The optical transceiver includes optical connectors 11 and 12 which are located at one end of the optical transceiver and to which optical fibers for transmission and reception are to be connected, respectively, and an electrical connector 13 which is located at the other end thereof and is used to obtain power from an external apparatus and transmit and receive an electrical signal to/from an external apparatus.

The optical transceiver includes a housing 1 within which a circuit board 2, a light receiving unit 4 and a light emitting unit 5 are contained, an electronic circuit connected to the electrical connector 13 is mounted on the circuit board 2, and the light receiving unit 4 and the light emitting unit 5 are connected to the circuit board 2. Both the light receiving unit 4 and the light emitting unit 5 are partly covered with metallic brackets 6 and 7 having shield facilities, respectively, and more specifically, lead pins 43 and 53 to be described later are covered with the brackets 6 and 7, respectively. The light receiving unit 4 and the light emitting unit 5 are contained in the housing 1 in such a manner that sleeves 42 and 52 to be described later are inserted in cylindrical holes 14 and 15 connecting with the optical connectors 11 and 12 of the housing 1, respectively. The sleeves 42 and 52 are fixed by a holding member 8 (not shown in FIG. 3). The light receiving unit 4 and the light emitting unit 5 are electrically connected to and fixed on the circuit board 2 by the lead pins 43 and 53 to be described later, respectively. The circuit board 2 is fixed in the housing 1 by a board fastener 3, and the housing 1 is covered with a metallic cover 9 (not shown in FIG. 3). Moreover, an actuator 10 is located near the end of the housing 1 close to the optical connectors.

Next, the configuration of each structural component will be specifically described. Although the light receiving unit 4 and the bracket 6 thereof will be mainly described below, the similar configuration applies to the light emitting unit 5 and the bracket 7 thereof.

Figure 4:
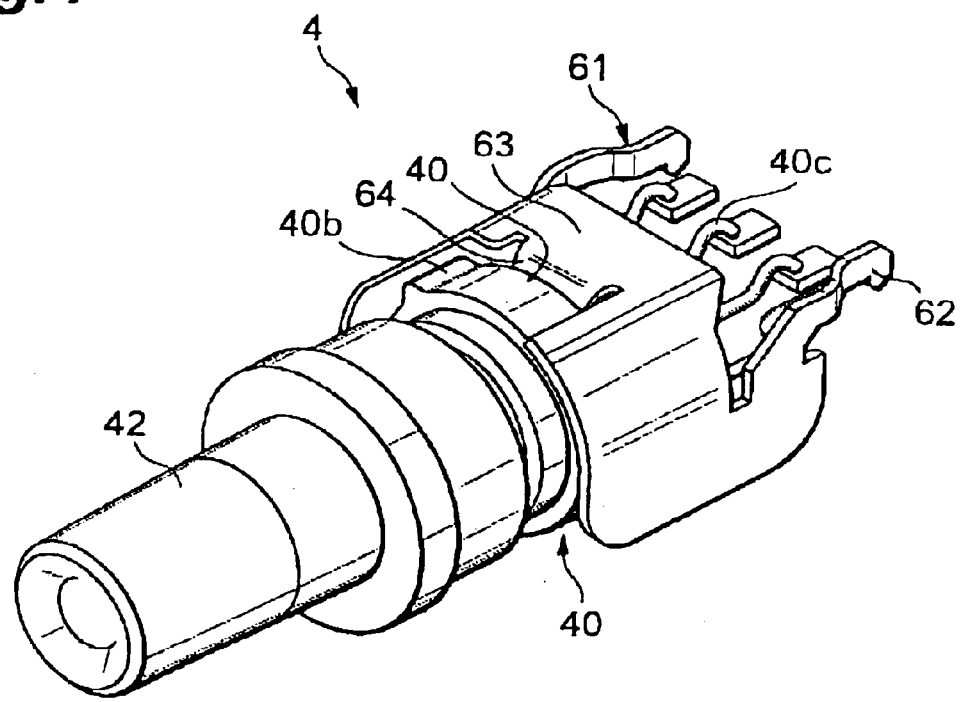
FIG. 4 is a perspective view of a light receiving unit of the optical module shown in FIG. 1.
Figure 5:
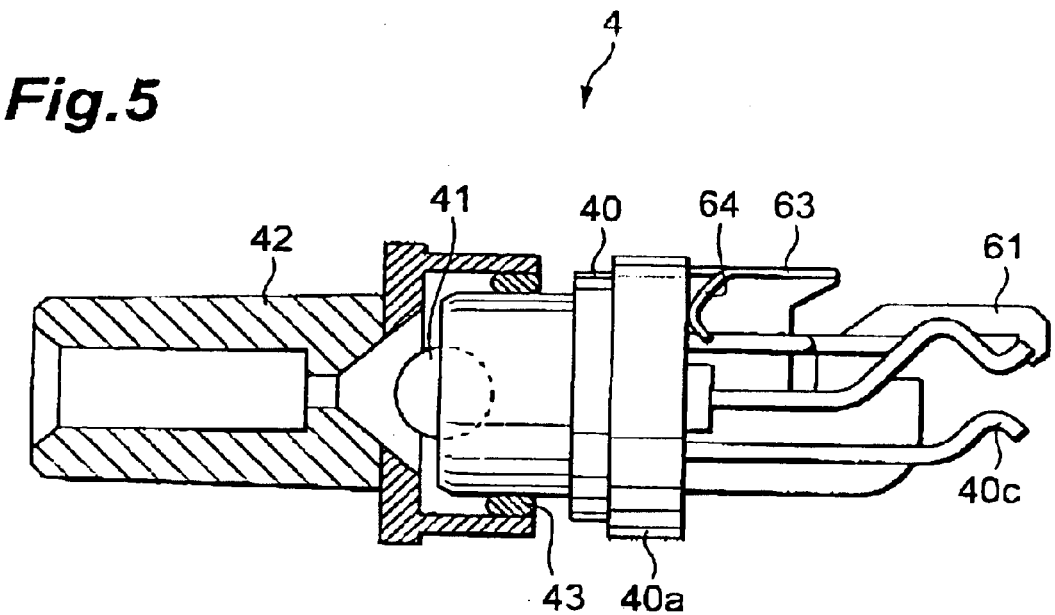
FIG. 5 is a cross-sectional view of the light receiving unit shown in FIG. 4.
Figure 6:
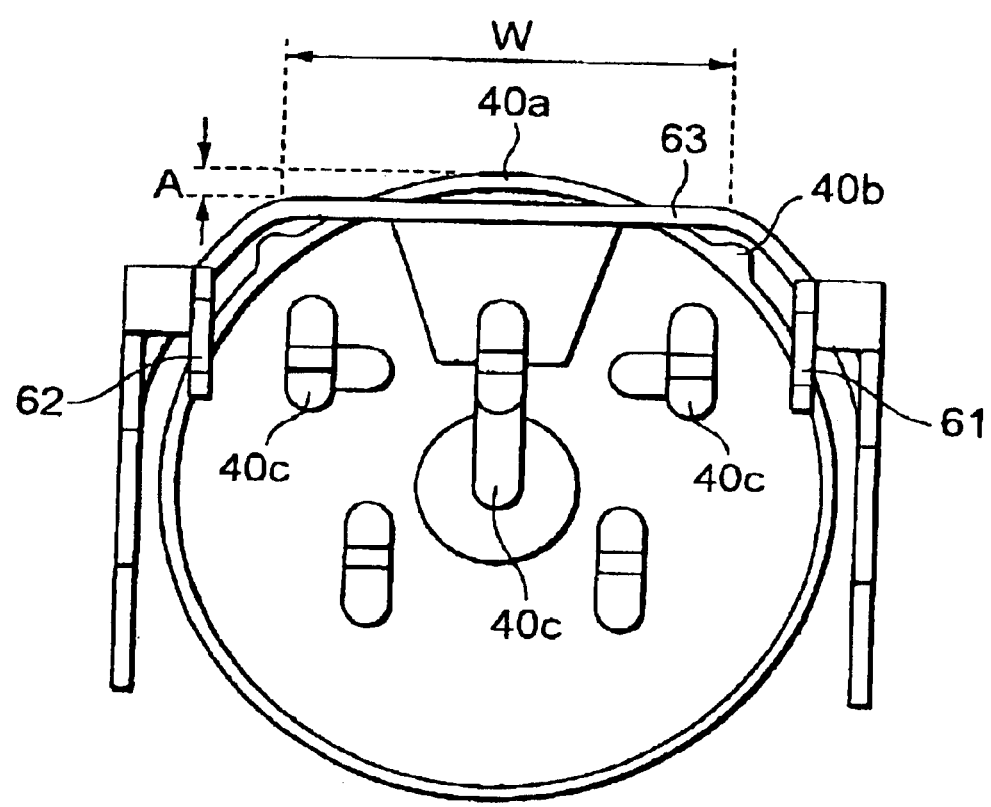
FIG. 6 is an illustration of the light receiving unit of FIG. 4 viewed on the side of a lead pin.

FIG. 4 is a perspective view of the light receiving unit 4 with the bracket 6 attached thereto, FIG. 5 is a cross-sectional view of the light receiving unit 4 shown in FIG. 4, and FIG. 6 is an illustration of the light receiving unit 4 viewed on the side of the lead pin. The light receiving unit 4 comprises a metallic package 40 which contains a light receiving device (e.g. a photodiode), an optical system and a preamplifier or the like and in which a lens 41 also serving as a cap is arranged over the overall light receiving surface, and the cylindrical sleeve 42 which is made of a resin and into which an optical fiber is to be inserted through the end thereof. The package 40 and the sleeve 42 are bonded by a resin 43 and thus integrated into the light receiving unit 4. The metallic package (a can package) 40 has a stacked structure in which cylinders having different outer diameters are concentrically stacked. In the package 40, five lead pins 40c for supplying power to the light receiving device and outputting a signal extend from the photodetector surface, namely, an end surface opposite to the sleeve 42 and close to the cylinder having the maximum outer diameter, and the ends of the lead pins 40b are corrugated. A projection 40b is provided on the cylinder of the package 40 having the maximum outer diameter (hereinafter referred to as a stem portion 40a). Generally, the light receiving device is located at the center of the stem portion 40a.

The bracket 6 has a symmetrical shape having two legs 61 and 62 protruding from a substantially semi-cylindrical body. A notch for exposing the stem portion 40a, when the bracket 6 is attached to the light receiving unit 4, is formed at the center of the body in the direction opposite to the direction in which the legs 61 and 62 protrude, and the body facing the notch is formed as a flat portion 63 having a flat surface, not a curved surface. Furthermore, a folded portion 64 extending from the flat portion 63 toward the notch is formed. Consequently, the stem portion 40a juts out beyond the flat portion 63 of the bracket 6 and is thus exposed, as shown in FIG. 6. Preferably, the flat portion 63 of the bracket 6 has the following dimensions: for example, a distance A between the flat portion 63 and a circumferential portion of the stem portion 40a is equal to or more than 0.2 mm, and a width W of the flat portion 63 is about 3 mm.

Figure 7:
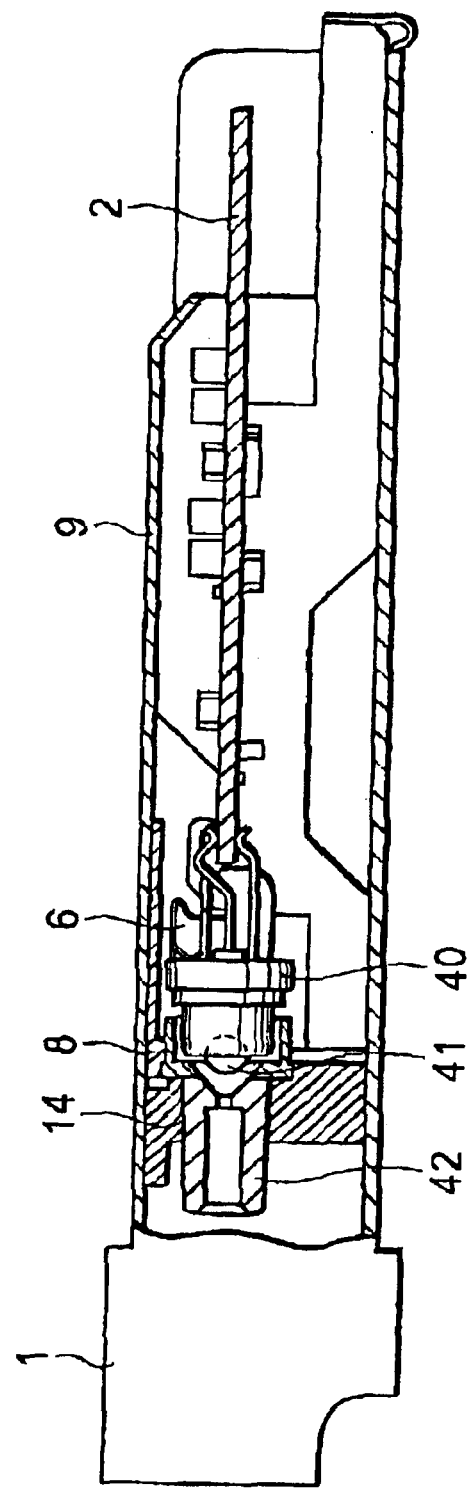
FIG. 7 is a cross-sectional view of the optical module shown in FIG. 1.

FIG. 7 shows a sectional structure of the optical module according to the present invention. The sleeve 42 of the light receiving unit 4 is inserted in the cylindrical hole 14 of the housing 1. The same holds true for the light emitting unit 5. The holding member 8 is engaged in the housing 1 by an engaging portion (not shown) with the light receiving unit 4 and the light emitting unit 5 covered therewith, thereby pressing and thus fixing the sleeves 42 and 52 of the units 4 and 5. Furthermore, the lead pins 40c of the light receiving unit 4 are soldered to and thus fixed on the circuit board 2 with the circuit board 2 sandwiched therebetween, and thus, the light receiving unit 4 is electrically connected to the circuit board 2. The legs 61 and 62 of the bracket 6 are soldered to the circuit board 2, the folded portion 64 thereof is also soldered to the package 40 of the light receiving unit 4, and thus, the bracket 6 is fixed with the lead pins 40c covered therewith. The similar combination applies to the light emitting unit 5 and the bracket 7.

In a conventional optical module, a distance between the stem portion 40a and the holding member 8 outside the portion 40a is short. Thus, when an attempt is made to locate the bracket 6 having shielding properties between the stem portion 40a and the holding member 8, there is a clearance of only about 0.2 mm between the bracket 6 and the holding member 8 even if the bracket 6 is located in contact with the stem portion 40a, provided that the bracket 6 has a thickness of 0.15 mm, for example. Thus, the bracket 6 may be in contact with the holding member 8 depending on misalignment of the respective axes of the sleeve 42 and the stem portion 40a, and consequently, the stem portion 40a or the sleeve 42 may be subjected to excessive stress, which may cause misalignment of the axis. Therefore, it is necessary to perform strict adjustment of an optical axis during manufacturing.

According to the optical module of the present invention, the bracket 6 can be located inside and thus a distance between the bracket 6 and the holding member 8 can be increased, as compared to the conventional optical module. For example, when the distance A is set to 0.2 mm even under the above-mentioned conditions, it is possible to provide a greater clearance equivalent to the distance A plus the thickness of the bracket 6, that is, a clearance of 0.35 mm. Therefore, this allows preventing contact between the bracket 6 and the holding member 8, and thus permits preventing the excessive stress acting on the light receiving unit 4 in itself and thereby preventing the misalignment of the axis. The same holds true for the light emitting unit 5.

The stem portion 40a is exposed by notching a part of the bracket 6, and this may lead to deterioration in electromagnetic shielding properties of the bracket 6. However, the deterioration in the shielding properties can be prevented because the outside of the stem portion 40a is covered with the metallic cover 9. Although the description has been given with regard to a mode in which the module is covered with the metallic cover 9, a metallic shielding material, for example, may be provided on a portion which is not in contact with the metallic packages and the brackets 6 and 7 of the light receiving unit 4 and the light emitting unit 5 which are located outside and inside the holding member 8.

Although both the brackets 6 and 7 are provided in the above-described embodiment, the effect of improving electrical properties of the bracket can be achieved by providing only either the bracket 6 or 7.

The present invention is not limited to the SFP or SFF type optical transceiver but may be suitably applied to various types of optical modules having a lead pin structure.

As described above, according to the present invention, the configuration and arrangement of the bracket having shielding properties are devised, and thus, even a small-sized optical module can avoid interference with a housing member and thus prevent the excessive stress acting on the light emitting unit and the light receiving unit which are optical subassemblies, while ensuring shielding properties. Therefore, it is possible to obtain an optical module which can be easily manufactured and has stable properties.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising:
    an optical unit including:
        a metallic package having a cylindrical stem,
        a light emitting or receiving device contained in said metal package,
        a cylindrical sleeve located in a light input/output terminal, and
        a lead pin extended from said stem to a side opposite to the sleeve and connected to said device;
    a board having an electronic circuit connected to the lead pin;
    an electrically conductive bracket secured to said board, said bracket covering the lead pin; and
    a housing which contains the optical unit, said bracket and the board,
    wherein an optical axis of said device aligns in line with the center axes of said cylindrical stem and sleeve, and
    wherein the bracket is disposed so that a part of said stem is exposed and an outer wall surface of said bracket which exposes the part of said stem is located inside a circumferential wall surface of said stem and close to the center axis of said stem in a diameter direction.

2. The optical module according to claim 1, wherein said bracket has a flat surface on the outer wall surface at the portion which exposes said stem.

3. The optical module according to claim 1, wherein said housing includes a metallic cover which covers a portion extending from said board to said optical unit through said bracket.

4. The optical module according to claim 1, wherein said board has a signal input/output terminal and a power terminal for an external apparatus, which are located on the side opposite to the side to which said optical unit is disposed.

5. The optical module according to claim 1, comprising a plurality of optical units.

6. The optical module according to claim 5, said optical units include a light emitting unit having a light emitting device, and a light receiving unit having a light receiving device.

* * * * *